(12) United States Patent
Toft et al.

(10) Patent No.: US 8,968,440 B1
(45) Date of Patent: Mar. 3, 2015

(54) FERTILIZER PRODUCTION

(71) Applicant: Phosfix Fertilizer & Soil Amendment LLC, Curtis Bay, MD (US)

(72) Inventors: Stephen R. Toft, Harwood, MD (US); Lisa L. Williams, Pasadena, MD (US); Calvin O. Miller, Canal Winchester, OH (US); William K. Blanchet, Severna Park, MD (US)

(73) Assignee: Phosfix Fertilizer & Soil Amendment LLC, Curtis Bay, MD (US)

( * ) Notice: Subject to any disclaimer, the term of this patent is extended or adjusted under 35 U.S.C. 154(b) by 0 days.

(21) Appl. No.: 14/173,196

(22) Filed: Feb. 5, 2014

(51) Int. Cl.
*C05F 7/00* (2006.01)
*C05F 11/00* (2006.01)
*C05D 1/02* (2006.01)
*C05D 3/00* (2006.01)

(52) U.S. Cl.
CPC ...... *C05D 1/02* (2013.01); *C05D 3/00* (2013.01)
USPC .................................. 71/11; 71/12

(58) Field of Classification Search
CPC .............. C05F 7/00; C05F 11/00; C05F 3/00
USPC .................................. 71/11, 12, 24
See application file for complete search history.

(56) References Cited

U.S. PATENT DOCUMENTS

| | | | |
|---|---|---|---|
| 3,979,199 A | 9/1976 | Collins | |
| 5,158,594 A | 10/1992 | Oxford | |
| 5,264,017 A * | 11/1993 | Van de Walle | 71/61 |
| 6,299,663 B1 * | 10/2001 | Phinney | 71/64.13 |
| 6,752,848 B2 * | 6/2004 | Logan et al. | 71/11 |
| 7,175,683 B2 | 2/2007 | Cabello-Fuentes | |
| 7,789,931 B2 * | 9/2010 | Burnham et al. | 71/11 |
| 7,947,105 B2 * | 5/2011 | Burnham | 71/11 |
| 8,007,558 B2 * | 8/2011 | Audet | 71/6 |
| 8,062,405 B1 * | 11/2011 | Reiter et al. | 71/21 |
| 8,075,659 B2 | 12/2011 | Wissemeier et al. | |
| 8,241,389 B2 | 8/2012 | Spindler et al. | |
| 8,425,648 B2 | 4/2013 | Cisneros et al. | |
| 8,491,693 B2 * | 7/2013 | Burnham | 71/11 |
| 8,557,013 B2 * | 10/2013 | Burnham et al. | 71/11 |
| 2003/0172699 A1 * | 9/2003 | Phinney | 71/64.03 |
| 2005/0005660 A1 * | 1/2005 | Burnham et al. | 71/11 |
| 2006/0243009 A1 * | 11/2006 | Burnham | 71/11 |
| 2011/0265532 A1 * | 11/2011 | Burnham et al. | 71/8 |
| 2011/0265533 A1 * | 11/2011 | Burnham | 71/12 |
| 2012/0034286 A1 * | 2/2012 | Zhang | 424/405 |
| 2012/0234063 A1 * | 9/2012 | Burnham | 71/13 |
| 2012/0247164 A1 * | 10/2012 | Dahms et al. | 71/8 |
| 2013/0091913 A1 * | 4/2013 | Al-Yateem | 71/12 |
| 2013/0091914 A1 * | 4/2013 | Al-Yateem | 71/12 |
| 2013/0180299 A1 * | 7/2013 | Burnham | 71/13 |

OTHER PUBLICATIONS

Chen, Li-Ming et al, "Effects of gypsum enhanced composts on yields and mineral compositions of Broccoli and tall fescue", Journal of Plant Nutrition (2010), 33 (7), 1040-1055.*

* cited by examiner

*Primary Examiner* — Wayne Langel
(74) *Attorney, Agent, or Firm* — Sturm & Fix LLP

(57) ABSTRACT

The present invention provides a fertilizer utilizing the inexpensive waste and by-product materials of biosolids, gypsum, and/or other phosphorus binding agents, such as iron or aluminum chemicals or by-products with elevated levels of iron and aluminum. The combination of biosolids, gypsum and other phosphorus binding agents, such as iron or aluminum chemicals or by-products with elevated levels of iron and aluminum produces a fertilizer that provides for soil nitrogen needs while limiting the availability of phosphorous to minimize environmental pollution.

6 Claims, 2 Drawing Sheets

FERTILIZER PRODUCTION

BACKGROUND OF THE INVENTION

1. Field of the Invention

The present invention relates to the field of fertilizer production, and more particularly to a fertilizer including biosolids, and calcium sulfate dihydrate.

2. Description of Related Art

As can be seen by reference to the following U.S. Pat. Nos. 3,979,199; 5,158,594; 7,175,683; 8,062,405; 8,075,659; 8,241,389; and 8,25,648, the prior art is replete with myriad and diverse fertilizers.

As can be seen in U.S. Pat. No. 3,979,199, pulverized phosphate rock can be spread onto, or mixed into soil which is to be fertilized. The soil is then treated with a solution of sulfurous acid, usually the output of a device which burns sulfur in air to form sulfur dioxide and then dissolves the sulfur dioxide in water. The water may be irrigation water which thereupon both irrigates the soil and reacts with the phosphate rock to fertilize the soil. Common phosphate ores include a substantial amount of calcium, with which and with oxygen, the sulfurous acid reacts to form gypsum (calcium sulfate). Gypsum is a widely-used corrective substance applied to croplands, and the gypsum formed by this treatment reduces the requirement to purchase gypsum as a product separate from the fertilizer. Substantially, all of the phosphorus contained in the rock can ultimately be solubilized as "available phosphate" with the use of this method.

Further as seen in U.S. Pat. No. 5,158,594, this patent teaches the process for converting phosphor-gypsum waste product from the wet process of manufacturing phosphoric acid from phosphate rock by ammoniating said product at a pH of 6.5 or less and adjusting the phosphorus and potassium values of said ammoniated product by addition of one or more sources of potassium and phosphorus.

U.S. Pat. No. 7,175,683, teaches a process for transforming sludge into NPK type granulated fertilizer in which the energy consumed is reduced 90% by the addition of a special filtration step. In that step, the water content is reduced 50%, and the remaining water is evaporated by the exothermic reaction occurring in the process. This process includes mechanisms that allow some of the by-products generated by some of the reactions such as gypsum, to adsorb crystallization water, thereby reducing the humidity of the mass without using external energy.

U.S. Pat. No. 8,062,405 is a value added granulated organic fertilizer produced from poultry litter and biosolids using agglomeration techniques with a pin mixer. The granulated organic fertilizer includes granules of biosolids, a nitrification inhibitor, such as dicyandiamide, and a binding agent, such as lignosulfonate, urea formaldehyde, or water. The nitrogen concentration of the granulated organic fertilizer is increased by being fortified with urea. The poultry litter and biosolids formulated into the granulated organic fertilizer aid in flowability, storage, and spreading, while value added plant nutrient ingredients provide an environmentally safer fertilizer than fresh poultry litter, municipal biosolids and/or many commercially available products commonly used in urban and agricultural systems. The binding agents change the fertilizer granule water soluble phosphorus and nitrogen concentrations and reduce fines and dust. The nitrification inhibitor reduces nitrogen losses via leaching and dentrification, while biosolids decrease water soluble and total phosphorus concentrations in runoff water for environment protection.

Further, as referenced in U.S. Pat. No. 8,075,659, preparations with improved urease-inhibitory effect which comprise at least two different (thio)phosphoric triamides and to urea-comprising fertilizers which comprise these preparations are taught. Furthermore, a method of preparing these preparations, to the use of these preparations in the fertilization with urea-comprising fertilizers, and to the use of urea-comprising fertilizers which comprise these preparations in agriculture or in horticulture are taught.

U.S. Pat. No. 8,241,389 relates to a method and a device for producing nitrogen fertilizer, removing phosphate from organic waste products in liquid phase, sanitizing said waste or reducing emissions, and limiting the potassium concentration. The waste product is heated to temperatures ranging between 40° C. at a subatmospheric pressure. The escaping gas that contains carbon dioxide and ammonia is contacted with a mineral aqueous suspension, then the excess gas is conducted within the circuit while the subatmospheric pressure is autogenously stabilized. Then the formed nitrogen fertilizer is discharged. In order to additionally produce phosphate fertilizer and limit the potassium concentration, the obtained fertilizer product is divided into the liquid and solid portion. All or some of the solid portion is redirected into the stripping receptacle while the liquid waste product that is stripped of nitrogen and compounds and phosphorus compounds is cooled and mixed with at least one sulfate containing compound to limit the small amount of a basic mineral powder is added thereto. The last solid portion obtained from the treatment can be used directly as phosphate fertilizer, potassium fertilizer, or phosphate containing and potassium containing mixed fertilizer.

Finally, U.S. Pat. No. 8,425,648 describes a slow calcium release fertilizer and methods for their synthesis. Organic materials, particularly from manure, are used for coating to achieve slow release forms of fertilizer. It is desirable to use low temperature kinetic treatments to prepare pulverized forms having small size, yet well coated with natural (non-denature) molecular material to achieve the slow release. Kinetic processing of rock gypsum and manure at low temperatures with added acid is a desired embodiment. Use of fertilizers leads to acceleration of microbial viability.

Particularly within the mid-Atlantic states, as a result of Chesapeake Bay water quality concerns, there is a great deal of environmental regulation with regards to agricultural nutrients. For many years, the primary concern was nitrogen runoff as it is easily water soluble and that which is not taken up by a crop can percolate to groundwater or runoff to surface waters. Nutrient management plans and specific application rates address this particular matter and there is typically no soil residual from year to year aside from that which must be broken down in organic matter decomposition. Of primary concern to commercial agriculture at this time is soil phosphorus. In the 1980's, the research of the time and overall soil phosphorus levels recommended adding at least that phosphorus which was required for plant uptake, but that amounts over these values was fine as it basically went into a "soil bank" whereby it would be available as needed. Unlike nitrogen application, phosphorus is typically bound tightly in the soil matrix and not free to travel off-site or into the groundwater. At the time phosphorus water pollution was strictly limited to reducing soil runoff as phosphorus would contaminate waterways if it was attached to the soil particles. Over many years of addition of larger than desirable phosphorus amounts to soils there is an overabundance of that nutrient. At high levels, the phosphorus is not as tightly held and that which is readily available and taken up by the plant may, by being water soluble, enter ground and surface waters. Nutrient management plans now take phosphorus addition and soil phosphorus background levels and with the above statement in mind, products such as manures and biosolids become phosphorus limiting up to and including no application allowed. In other words, to supply the required nitrogen with a given product, too much phosphorus would be added to the soil thereby precluding application. Biosolids and animal manures are particularly of issue with regards to this statement, and yet, as they are produced, they must be used in the existing and natural state.

While all of the aforementioned prior art inventions are adequate for the basic purpose and function for which they have been specifically designed, they are uniformly deficient with respect to their failure to provide a simple, efficient, and practical way to provide an inexpensive fertilizer including biosolids with inexpensive materials that limits phosphorous availability.

As a consequence of the foregoing situation, there has existed a longstanding need for a new and improved fertilizer using biosolids and gypsum and/or other phosphorus binding agents, such as iron or aluminum chemicals or byproducts with elevated levels of iron and aluminum.

BRIEF SUMMARY OF THE INVENTION

Briefly stated, the present invention provides a fertilizer utilizing the inexpensive waste and by-product materials of biosolids, gypsum, and/or iron and aluminum phosphorus binding chemicals or byproducts. The combination of biosolids, gypsum, and phosphorus binding agents produces a fertilizer that provides for soil nitrogen needs while limiting the availability of phosphorous to minimize environmental pollution.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with drawings, wherein.

DETAILED DESCRIPTION OF THE INVENTION

Figure 1:
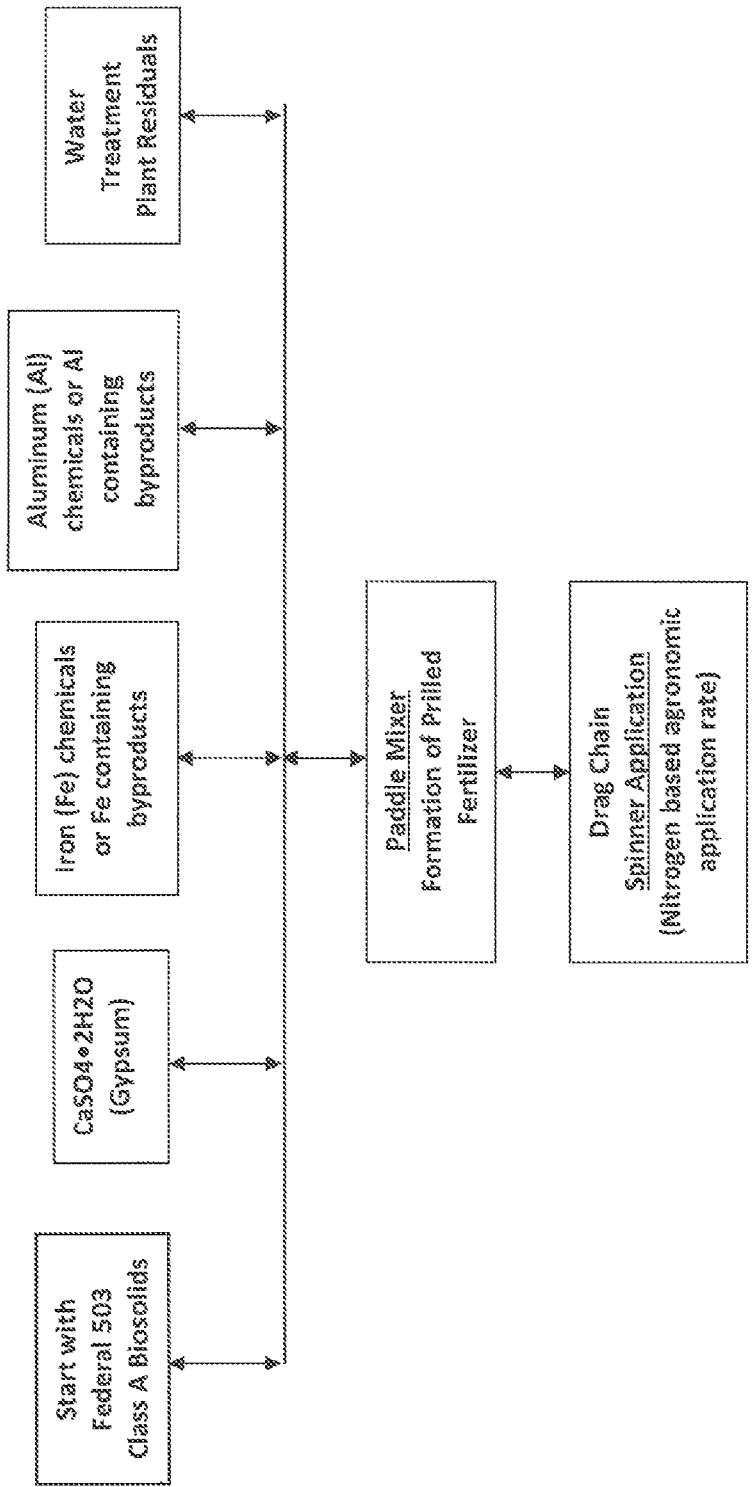
FIG. 1 is a flow diagram illustrating the production of the fertilizer of the present invention.
Figure 2:
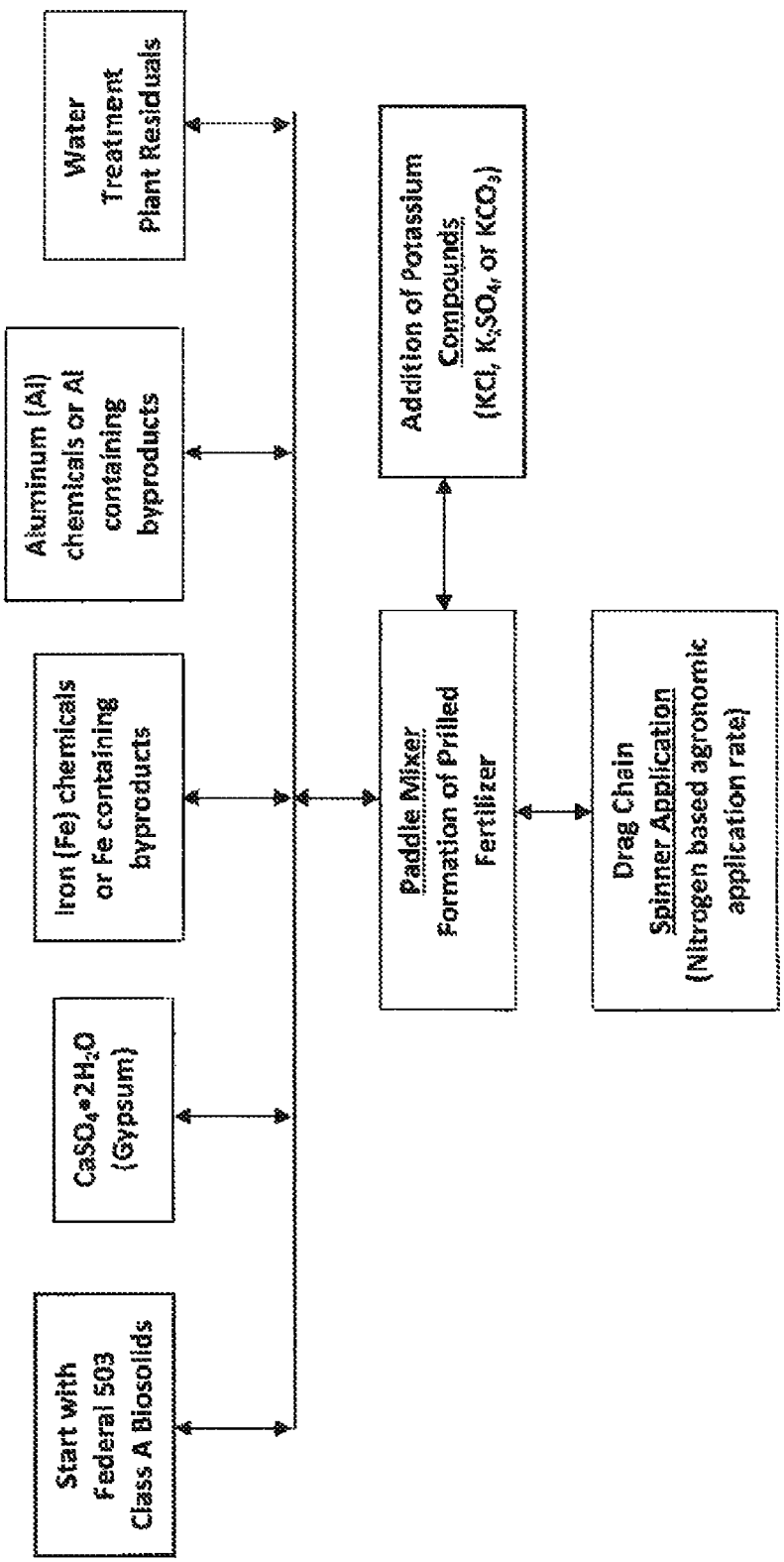
FIG. 2 is a flow diagram showing the production of an alternate embodiment of the fertilizer.

Based on the prior art, it is highly desirable if animal manures and municipal biosolids could be applied to agricultural soils at nitrogen limiting rates without adding any appreciable available phosphorus. There is research ongoing at various land grant universities, whereby adding materials such as alum which is used as a coagulating agent in the treatment of drinking water, when land applied to agricultural lands, ties up available phosphorus making it unavailable in a water soluble form. However, the Alum is directly applied to the field, not mixed with biosolids or manures to make a manufactured low phosphorus available organic fertilizer product. Although other materials exhibit this chemical property applicants' bench test results have focused on gypsum as an additive since it is inexpensive and readily available. Among other sources, such as surface mining gypsum (calcium sulfate dihydrate) is generated as a waste product as a result of using chemical grade quick lime in coal fired power plants for controlling air emissions. As the lime reacts with sulphur, it produces calcium sulfate as a water by-product. Some of this waste product is used in the manufacture of drywall, but a good deal remains which is usable as an agricultural amendment. Gypsum is periodically used in various areas of the country to mitigate soluble salt content, improve soil texture, as well as add calcium and sulphur so it is a known soil amendment.

The particular focus of the present invention is using calcium sulfate dihydrate and other phosphorus binding agents, such as iron or aluminum. Chemicals or by-products with elevated levels of iron or aluminum blended with municipal biosolids or manures to produce a product which supplies crop nitrogen needs while limiting available phosphorus which is not required and may contribute to environmental pollution. Specifically, in full scale bench testing, applicants have taken municipal biosolids, calcium sulfate and muriate of potash (KCl) (0-0-60 commercial fertilizer) to blend a product which supplies 100% of nitrogen and potassium requirements while contributing no net phosphorus increase. Potassium is essentially absent in these wastes, yet is also required for crop production in significant amounts. By blending a complete fertilizer, including the potassium component, one application can achieve the desired nutrient application rate. With the gypsum acquired for testing, applicants found that using a ratio of approximately one part biosolids to two parts gypsum yielded a material that when applied at a rate of eight (8) tons per acre in that instance supplied 100% nitrogen needs while leaving soil test results indicating no phosphorus had been added. With this mixture prior to application, 80 actual available pounds of potassium were added to the eight (8) tons to meet crop potassium requirements. Using 0-0-60 muriate of potash, as 60% is available, this equates to an addition of 133 pounds of 0-0-60 fertilizer. It is to be understood that potassium may be in the form of $KSO_4$, or, $KCO_3$ if chloride is not desired. Actual blending ratios and final application rates will vary depending upon the nitrogen content of the biosolids and/or manures blended. In all cases, application rates will be determined based upon agronomic rates for the crop to be grown.

EXAMPLE 1

Approximately 100 pounds of agricultural soils from a field known to have high phosphorus index results were collected. This material was placed into a standard portable electric cement mixer to thoroughly blend the material so that it was completely uniform in nature and chemical composition. One sample was separated to have analyzed by a soil lab for baseline results. For the fertilizer material produced, municipal biosolids were mixed with gypsum at a ratio of approximately 1:2 and potassium was added to achieve crop requirements which in this instance equated to a rate per acre of eight (8) tons. Weigh scales were used to precisely measure out soil and fertilizer with this mixture being thoroughly blended. An acre furrow slice of soil weighs between 2-3 million pounds so the eight (8) ton per acre rate may be calculated on a bench test scale. After mixing the soil/fertilizer mixture was sent out for analysis which indicated the impact of fertilizer addition and no measurable change to soil phosphorus. It is therefore possible that through this mixture biosolids or manure could be blended as outlined in such a way that a farm operator could economically use this waste product in accordance with his nutrient management plan while recognizing significant savings through its addition.

EXAMPLE 2

Subchapter O in Chapter 1 of Title 40 of the Code of Federal Regulations, Part 503, "Standards for the Use and Disposal of Sewage Sludge" (hereinafter "Federal 503") is incorporated herein by reference and is attached hereto as Appendix A.

Biosolids meeting Federal 503 regulations for "A" Class may simply be blended with gypsum and/or other phosphorus binding agents, such as iron or aluminum chemicals or byproducts with elevated levels of iron and aluminum and potash as outlined in Example 1, above to produce fertilizer.

EXAMPLE 3

Biosolids must be converted first into a Federal 503 Class A product. After biosolids meet Federal Class "A" designation, they are blended in the same way of in Example 1 above.

Other phosphorus binding materials such as iron and aluminum chemicals, Alum from municipal drinking water treatment or other by-products with elevated levels of iron and aluminum may be added or substituted for gypsum

EXAMPLE 4

The mixing process uses a paddle mixer which rolls and coats the product leaving a prill type or pelletized material at a dryness which facilitates easy application with standard drag chain spinner applicators commonly used for soil amendment or fertilizer application.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A fertilizer comprising:
   biosolids;
   and a phosphorus binding agent selected from the group consisting of aluminum compounds and by-products containing aluminum.

2. The fertilizer of claim 1, further including potassium adequate to achieve crop requirements when applied at a material rate equal to the agronomic need of the crop to be grown.

3. The fertilizer of claim 2, wherein the potassium is in the form of potassium chloride (KCl).

4. A fertilizer comprising;
   biosolids; and
   a phosphorus binding agent, wherein the phosphorus agent is calcium sulfate dihydrate, and wherein the biosolids and calcium sulfate dihydrate are present in a ratio of about 1:2.

5. The fertilizer of claim 4, further including potassium adequate to achieve crop requirements when applied at a material rate equal to the agronomic need of the crop to be grown.

6. The fertilizer of claim 5, wherein the potassium is in the form of potassium chloride (KCl).

* * * * *